United States Patent
Bates et al.

(10) Patent No.: US 8,823,194 B2
(45) Date of Patent: Sep. 2, 2014

(54) MODULAR ALTERNATIVE ENERGY UNIT

(71) Applicant: Windstream Technologies, Inc., Manhattan Beach, CA (US)

(72) Inventors: Daniel L. Bates, Manhattan Beach, CA (US); Bob G. Schlicher, Concord, TN (US); John R. Owen, Calabasas, CA (US); Ravi K. Tangirala, Falls Church, VA (US); Srinivas K. Guntur, Herndon, VA (US); Gary E. Johnson, San Jose, CA (US)

(73) Assignee: Windstream Technologies, Inc., Northeye Vernon, IN (US)

( * ) Notice: Subject to any disclaimer, the term of this patent is extended or adjusted under 35 U.S.C. 154(b) by 0 days.

(21) Appl. No.: 14/026,161

(22) Filed: Sep. 13, 2013

(65) Prior Publication Data

US 2014/0097622 A1   Apr. 10, 2014

Related U.S. Application Data

(63) Continuation of application No. 12/657,914, filed on Jan. 29, 2010, now Pat. No. 8,536,720.

(60) Provisional application No. 61/214,402, filed on Apr. 23, 2009.

(51) Int. Cl.
*F03D 9/00* (2006.01)

(52) U.S. Cl.
USPC .............................................. 290/44; 290/55

(58) Field of Classification Search
USPC ........................................ 290/44, 55; 415/4.2
See application file for complete search history.

(56) References Cited

U.S. PATENT DOCUMENTS

| | | | |
|---|---|---|---|
| 5,850,108 A | 12/1998 | Bernard | |
| 5,969,430 A | 10/1999 | Forrey | |
| 6,674,181 B2 | 1/2004 | Harbison | |
| 6,740,988 B2 | 5/2004 | Tseng | |
| 7,682,127 B2 | 3/2010 | Paul | |
| 7,766,601 B2 | 8/2010 | Vida Marques | |
| 7,816,802 B2 | 10/2010 | Green | |
| 8,536,720 B2 * | 9/2013 | Bates et al. | 290/44 |
| 2006/0087201 A1 | 4/2006 | Spinelli | |

(Continued)

FOREIGN PATENT DOCUMENTS

| | | |
|---|---|---|
| JP | A-2001-200780 | 7/2001 |
| JP | A-2002-310057 | 10/2002 |
| JP | A-2003-021045 | 1/2003 |
| JP | A-2005-171868 | 6/2005 |

*Primary Examiner* — Tho D Ta
(74) *Attorney, Agent, or Firm* — David L. Hoffman; Hoffman Patent Group

(57) ABSTRACT

A wind energy apparatus is made up of a plurality of modular wind energy devices or units. Each unit has a housing and at least two turbines mounted on the housing. Each of the turbines has a blade set extending upward from the housing. Each blade set has a vertical axis extending upward in relation to the housing. Each of the turbines has a generator connected thereto, each generator being disposed in the housing, and having a rotor and a stator. Each turbine is rotatably mounted with respect to the housing, and mounted to the rotor so that they rotate together. Each housing has a positive connector and negative connector on each side of the respective unit. The units, when placed together, connect their respective poles, positive and negative, together completing a circuit. Therefore, one may connect multiple units together.

20 Claims, 14 Drawing Sheets

(56) References Cited

U.S. PATENT DOCUMENTS

2007/0059097 A1 3/2007 Chen
2007/0090653 A1 4/2007 Martelon
2007/0264116 A1 11/2007 Dempster

* cited by examiner

MODULAR ALTERNATIVE ENERGY UNIT

CROSS REFERENCE TO RELATED APPLICATION(S)

This application is a continuing application of U.S. patent application Ser. No. 12/657,914 filed Jan. 29, 2010, now becoming U.S. Pat. No. 8,536,720, and U.S. Provisional Patent Application Ser. No. 61/214,402 filed Apr. 23, 2009, all of which are incorporated by reference herein and priority is claimed from all of which.

BACKGROUND OF THE INVENTION

1. Field of the Invention

The present invention relates generally to the field of apparatuses for converting energy from flowing fluid into electricity or another power type. Moreover, it pertains specifically to a modular, extensible apparatus and system for converting wind, water or other fluid energy into electricity or another form of mechanical energy. Accordingly, the present invention provides a solution to the shortcomings of prior wind turbine systems, apparatuses, and methods, especially for low speed or urban winds.

2. Description of the Related Art

Alternative energy or renewable energy solutions and technologies have been explored including wind and solar for many decades. Yet, there is a huge untapped market for these energy creation devices. The challenge of finite natural resources (fossil fuels, oil and coal) is not limited to the United States. All countries are faced with this same problem giving rise to a worldwide need for economical, easy to use alternative energy products.

According to the World Energy Association, "The availability of wind power in the atmosphere is five times greater than the world's current energy consumption in all forms per year; yet wind energy currently produces approximately 1% of the world's electricity use."

To achieve a universal business and residential use device, it must not only be economical, but also must be aesthetically pleasing, highly efficient and easy to install.

A mass-produced renewable energy solution for residential and urban applications would be beneficial to all. However, creating devices economically which take advantage of "small winds" (known in the industry as Class 1, 2, 3) in a meaningful way is a great challenge. One problem is that existing generators have a moment of inertia to overcome to begin generating electricity and small winds are typically insufficient to overcome this state of rest. Moreover, urban and suburban residential and commercial buildings often have strict codes to adhere to, and face practical limitations on the use of wind-power. Wind turbines can be huge, and the dynamic forces of a spinning turbine are great. Use of such turbines in urban areas is dangerous.

Further, the industry has taught that wind with disruption, i.e., turbulent flow around structures and near the ground (in the "boundary layer") is not useful or desirable. Accordingly, wind energy devices have been relegated to rural areas. For example, in rural areas, there is sufficient room to build strong towers to hold the turbines up high with no structures in the surrounding area which allows wind forces to flow without significant disruption (laminar flow).

These alternative energy solutions have traditionally been focused on large or utility scale applications such as: removing the need for external sources of energy for a home or office and using a system of net metering, selling unused energy back to the utility company and/or feeding the energy directly into the public utility grid. Even a scaled down version of a wind turbine can be tens of feet in diameter. Each of these cases ignores the vast amount of available energy in urban settings.

According to an article dated Feb. 10, 2009 posted at News.cnet.com entitled "Study delivers blow to urban microwind turbines", by Martin LaMonica, Southwest Wind Power, which makes a small wind pole-mounted turbine, suggests minimum requirements for installation which include a ten mile-per-hour average wind and a twenty foot clearance above any obstructions. Another article (entitled "Study: Microwind turbines a tough sell in Mass.") dated Mar. 17, 2009 by the same author at the same web site, teaches that even small turbines must be well above obstructions to get useful output.

Wind speed seen by the turbine varies with the turbine's height above ground and any obstructions near the turbine. Trees, shrubs, buildings and other obstructions retard the flow of the wind. Each doubling of height of the turbine arguably increases the power available by ten percent. So the industry teaches increasing the height of the turbine to increase available wind power by about two times, such as taught by Paul Gipe, author of Wind Energy Come of Age.

In spite of the art teaching that it is not practical, what is needed is a way to take advantage of small winds, in a cost effective and energy efficient way.

SUMMARY OF THE INVENTION

Small Wind:

The present inventors sought to enable one to economically take advantage of "small wind power". "Small wind power" or "micro-wind" exists in urban areas and corridors where it is difficult to obtain predictable, consistent, and large amounts of wind power on a regular basis. Aside from natural wind flows, "wind rush" regularly seen in residential areas between the tight corridors of buildings and rooftops and "wind burst" created by automobiles passing on roadways, tunnels and overpasses are untapped. This energy can be harnessed and used to supplement the energy requirement of low power systems and equipment.

The places where the device may be used are limitless given its small size, such as a turbine with a blade height of 2 ft. to 5 ft, and blade set width of about one-fourth to one half of the height. Accordingly, the device can be placed on rooftops, walls, or fence lines and begin supplementing a user's electrical needs.

The compact and efficient nature of the device is designed to capture wind speed as low as about 2 m/s (about 4.5 mph).

The base containing multiple generators and having multiple turbines thereon provides a unique way to take advantage of very low velocity wind, and where the wind is coming from any direction.

This power can then be harnessed and converted into a sustainable energy resource.

Wind Power Theory:

It is understood that the power generated by a fluid turbine is proportional to the area swept by its blades.

Usage of multiple smaller generators as opposed to using one large generator: The inventors believe that at a given rpm, the torque required to turn three 50 W generators is smaller than the torque required to turn one 150 W generator by a factor of three. Therefore, the "wind force" required in the former case (three generators of "x" watts) is only one-third that in case of the latter (one generator of "3x" watts).

Goals of at Least Some Preferred Embodiments:

It is a goal, although not a requirement of the invention, that the relatively small, lightweight turbines on a vertical axis orientation with relatively low power generators exhibiting low static moment of inertia will generate energy substantially more of the time than the typical large turbines, as much as two or four times as often, e.g., 60-90% of the time.

The devices are preferably light weight, modular and durable with fault and failure protection. The devices are designed to protect and shield the electrical components from the natural elements (rain, snow, pollution, etc.) as well as from debris.

Modularity:

The units are easily installed and can be snapped together or daisy chained together to allow for greater total power generation capability.

Each device is preferably in a form like a "block" and built as a stand-alone power unit with fault and failure controls. Additional blocks can be "snapped" or connected together to increase electrical generation, creating a customizable power system.

The block structure is preferably fabricated with recycled plastics and utilizes mass production techniques such as injection or blow molding. Accordingly, it may be mass produced, unlike existing windmills. The device, which the art teaches cannot be useful small, can be made small and that enables mass production. Accordingly due to the smaller sized turbines, bases and component parts, it may be mass produced unlike existing windmills. Further, the use of multiple turbines and generators provides a reason for mass production.

The modular concept of the device enables each turbine to have any type of blade design, and to be snapped in and out, e.g., using a key/lock system. Two suitable blade designs are known as Darrieus or Savonius. Blade set design parameters—type and height/width, can be varied to meet the needs of specific applications and installations. Blade sets, generators, and all or most parts are preferably made to be interchangeable, and thus readily replaceable.

That each device is modular, such that it can be connected together ("cascaded") by direct plug in to another identical device, or by daisy-chaining (with a plug connector and wire), makes the device simple for any customer to install.

EXAMPLE APPLICATIONS

In one embodiment of the present invention, a wind capturing device (or unit) and system is available for a wide variety of uses. The device can be placed on roof tops, fence lines, center-dividers of roadways, on the sides of buildings, any place where there is a source of wind power.

The electricity generated from each block or system of blocks can be safely used to power any device. The device can charge a portable cell phone, iPod®, video camera, laptop, or other small device, can drive an inverter, or the energy can be stored in a battery or other storage unit.

The inventive devices can be set up along roadway center dividers to take advantage of vehicle "wind burst" to power highway lighting systems and emergency services. This power could even be provided to electric utility grids.

In another embodiment, devices that could power all common area lighting or communication services, especially around and/or on high-rise buildings.

Other Embodiments

The device may be made as a hybrid, either by making devices with small solar panels, which devices can work together with the wind-powered devices, and/or by making the solar panels mountable on two or more wind powered devices. The solar energy capture and wind capture may complement each other, as winds typically pick up as the sun lowers on the horizon.

The system may be embodied preferably as a "kit" which could include: One device (two or three turbines or more on the base), and the same number of generators in the base); a power storage unit; small electrical devices; and cord(s). In situations where it is desirable to provide power to the grid or reduce the power draw from the grid, a commercial off the shelf (COTS) inverter may be used. Due to the small size, mass production capability, and versatility of the devices, there are a myriad of possible uses.

DESCRIPTION OF THE PREFERRED EMBODIMENT(S)

Various exemplary embodiments of wind energy devices and systems are described in detail with reference to the drawings, in which like reference numbers represent like elements.

It is to be understood that the Figures and descriptions included herein illustrate and describe the elements that are of particular relevance to the invention, while eliminating, for purposes of clarity, other elements found in typical turbines and turbine control systems.

Systems, apparatuses, and methods of operation of the invention are described herein. Aspects of those embodiments may also be included in processor based apparatuses, multi-processor based systems, and articles of manufacture that contain instructions which, when executed by a processor cause the processor to control operation of the invention. Any reference in the specification to "one embodiment", "a certain embodiment", or any other references to an embodiment is intended to indicate that a particular feature, structure or characteristic described in connection with the embodiment is included in at least one embodiment and may be utilized in other embodiments as well. Moreover, use of such terms in various places in the specification does not necessarily mean that all refer to the same embodiment. References to "or" are intended as inclusive so "or" should be interpreted as "and/or".

Devices

Figure 1:
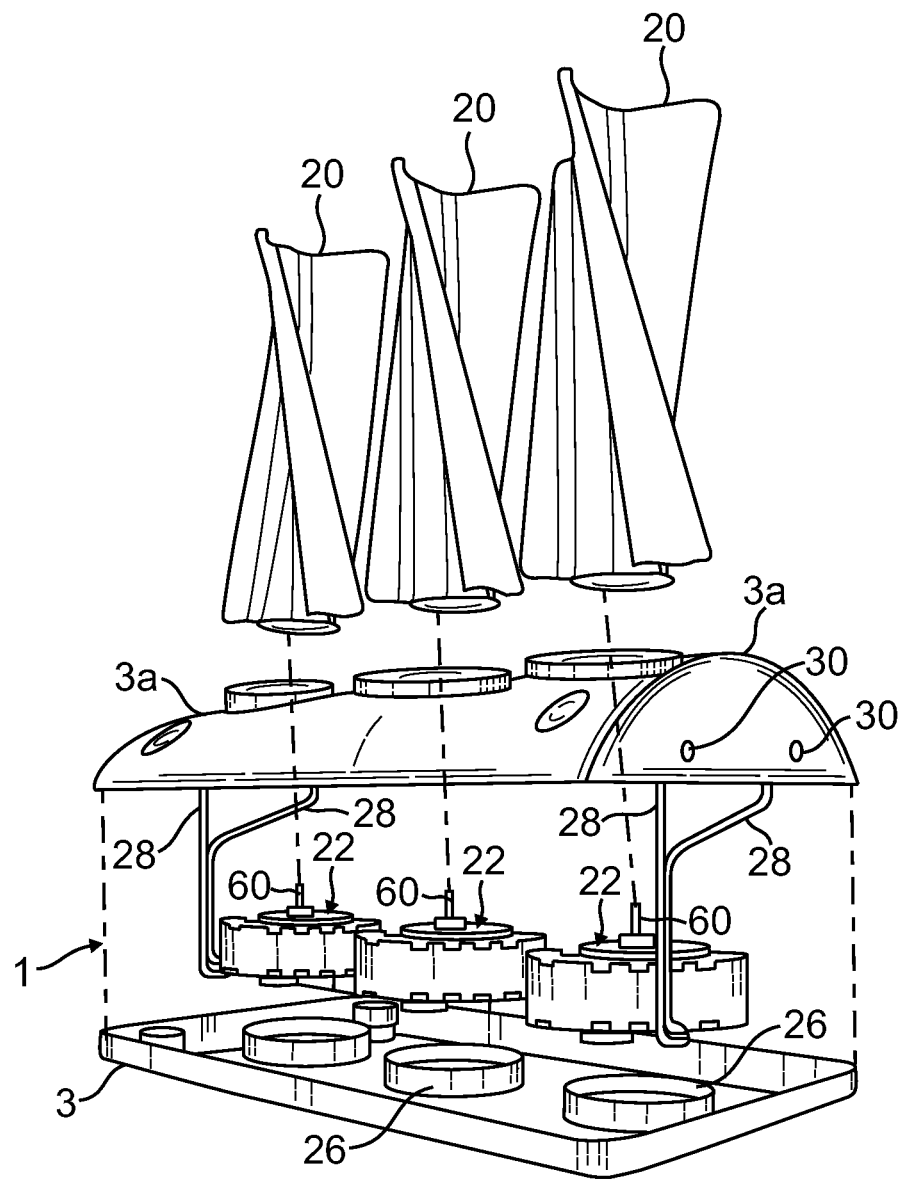
FIG. 1 is a schematic exploded view of one type of alternative energy device in accordance with a first embodiment of the invention.

FIG. 1 shows a wind energy device 1 in accordance with a first preferred embodiment Each device 1 consists of a minimum of two or more turbines 20, a housing having a bottom plate 3 and a cover 3a, two or more generators 22, a printed circuit board (PCB) (shown and described later), and two or more shafts 60 tying together each paired set of turbines 20 and generators 22.

The turbines 20 (or blade sets) preferably turn about a vertical axis through their centers. The housing (3,3a) contains multiple (e.g., AC) generators 22 (one for each turbine). Each turbine shaft is directly connected (e.g., by a set screw) to its respective AC generator shaft.

Figure 2:
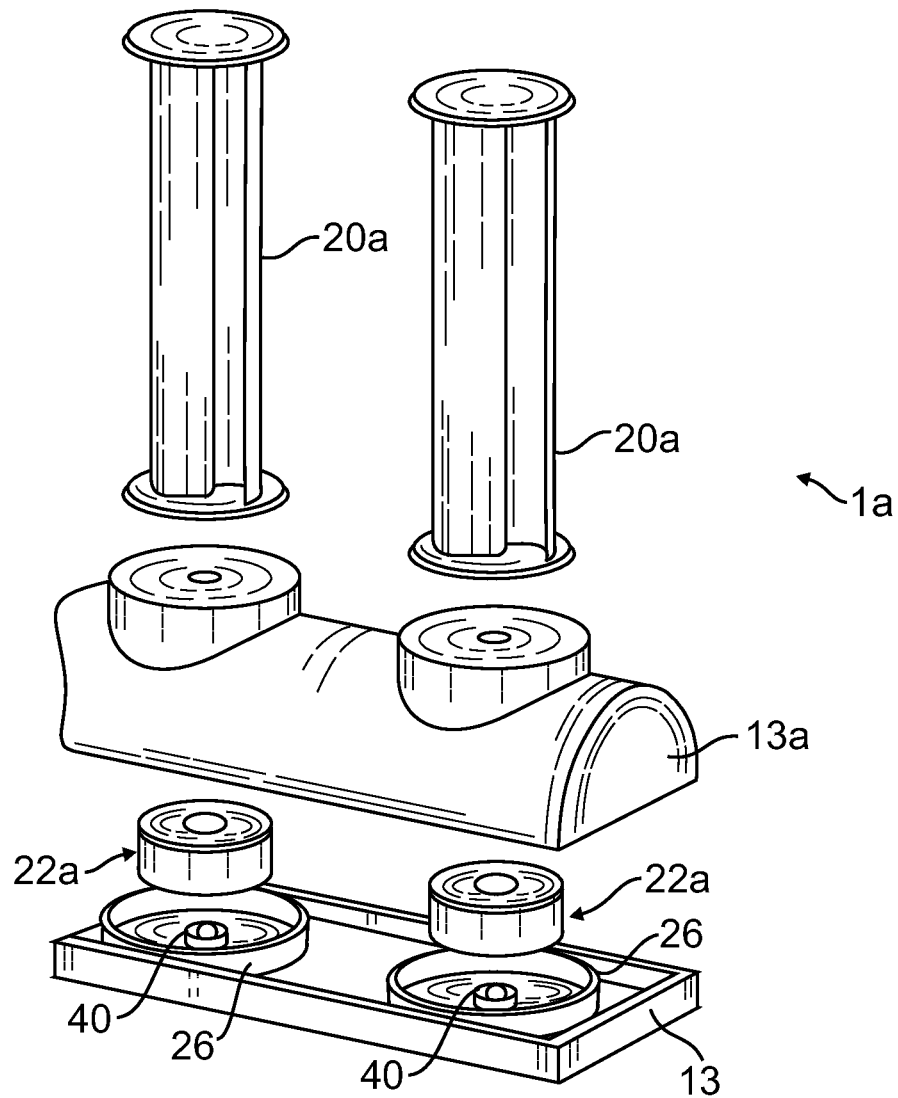
FIG. 2 is an exploded schematic view of another type of alternative energy device that has two turbines.

FIG. 2 shows an alternative embodiment of a wind energy device with two turbines 20a and two generators 22a on a housing having base 13 and cover 13a. The turbines 20a may be the same type as shown in FIG. 1, or different. As noted herein, the turbine shape for the vertical axis turbines is selectable in any embodiment, unless otherwise stated.

Figure 2A:
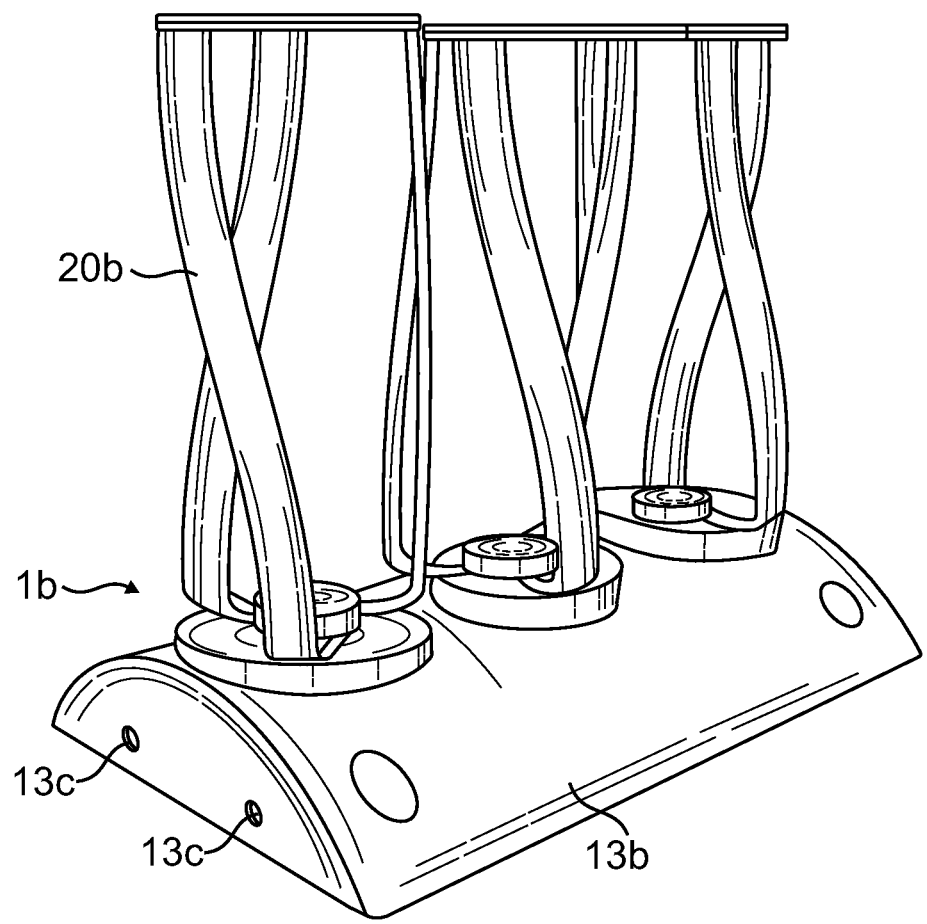
FIG. 2A is a perspective view of a device with a turbine having a Darrieus blade set.

FIG. 2A shows an alternative device 1b having three turbines 20b. There is a housing having a base and also a cover 13b. Device 1b is otherwise the same as device 1. Contacts 13c are visible at one end of the device.

Blade size, blade color and blade materials can be varied, and preferably are user selectable. Preferably, the parts of the device are replaceable. Housing shape, size and color can be varied as well.

The devices could have tabs on the base securing to a horizontal or vertical surface, or for securing to a diagonal surface or any surface. Further, the device need not be placed such that the turbine is vertical. The device can be mounted sideways or mounted upside down with the base above the turbine.

The turbine blade design can be a known design. FIGS. 1 and 2 shows, for illustrative purposes only, turbines with Savonius-type blade sets, but they could use Darrieus-type blades (see FIG. 2A) or a mixture (see FIG. 3) or other types of blade sets.

Figure 3:
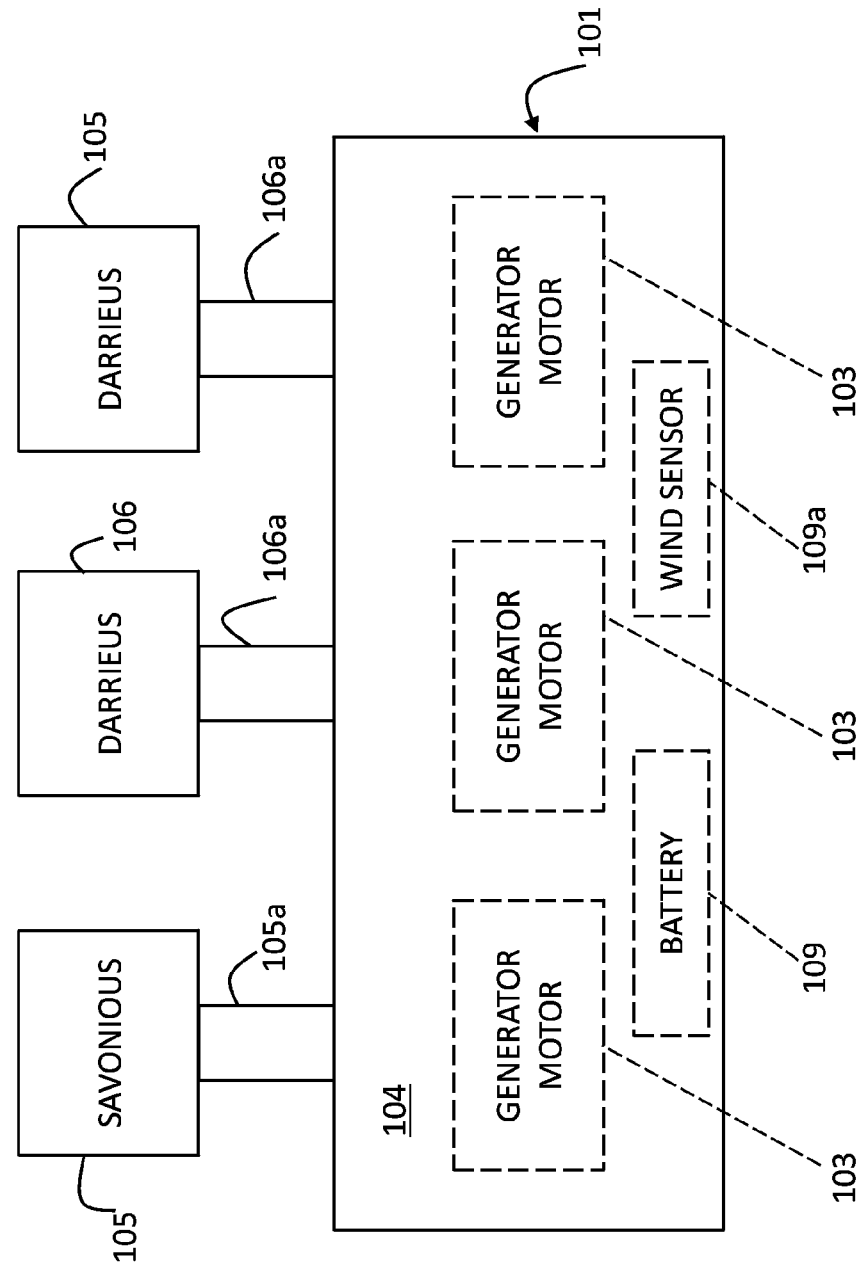
FIG. 3 is a schematic view of a device with a turbine having a Savonius blade set and Darrieus blade sets.

FIG. 3 further shows a self-starting embodiment of a device 101 where generators 103 also function as a motor, and/or where turbine 105 having helical (e.g., Savonius) blades is self-starting. There may also be a battery 109. In the case of a low wind, turbine 105 may start more easily than turbines 106 (Darius type blades). Therefore, shaft 105a starts its generator, and then the other generators are operated as motors to get shafts 106a turning and thus turbines 106 turning. Accordingly, inertia of the generators and turbines can be overcome even for very low wind.

Battery 109 may store some local energy and be used to operate generators as motors to get turbines 106 turning too. An onboard wind sensor 109a could be used to detect when sufficient wind exists to turn the motors on. When there is enough wind, the operation of generators as motors would change to cause the generators to produce power.

Generators and Their Electrical and Mechanical Connections

A key to a most preferred embodiment is that there is a generator for each turbine and the rotors are directly driven by the shafts of the turbines, meaning that there are no gears or gearing in such embodiment. In alternative embodiments, gearing, belts or pulleys, or the like may be used to obtain higher speeds of the generator's rotor.

The generator design can be a known design, but a preferred design runs at lower rpm than typical generators and an example is disclosed herein to meet the low rpm requirement.

With further reference to FIG. 1, base 3 and its cover 3a fits the generators 22 and wires 28 passing in essence in series or parallel from generator output to generator output. Wires 28, a positive and negative wire, also connect in series to input terminals 30 of a plug in end of the base and in series to output terminals 32 of the base. The base is preferably waterproof and otherwise sealed from the elements, so that it may be used outdoors. Further, the device is preferably low voltage, 48 VDC or less.

Seals 26 for each generator's rotors to the base 3 help waterproof the device. In addition, straps may be used to help mount the device. Other mounting methods would be evident to those of ordinary skill in the art.

Figure 4:
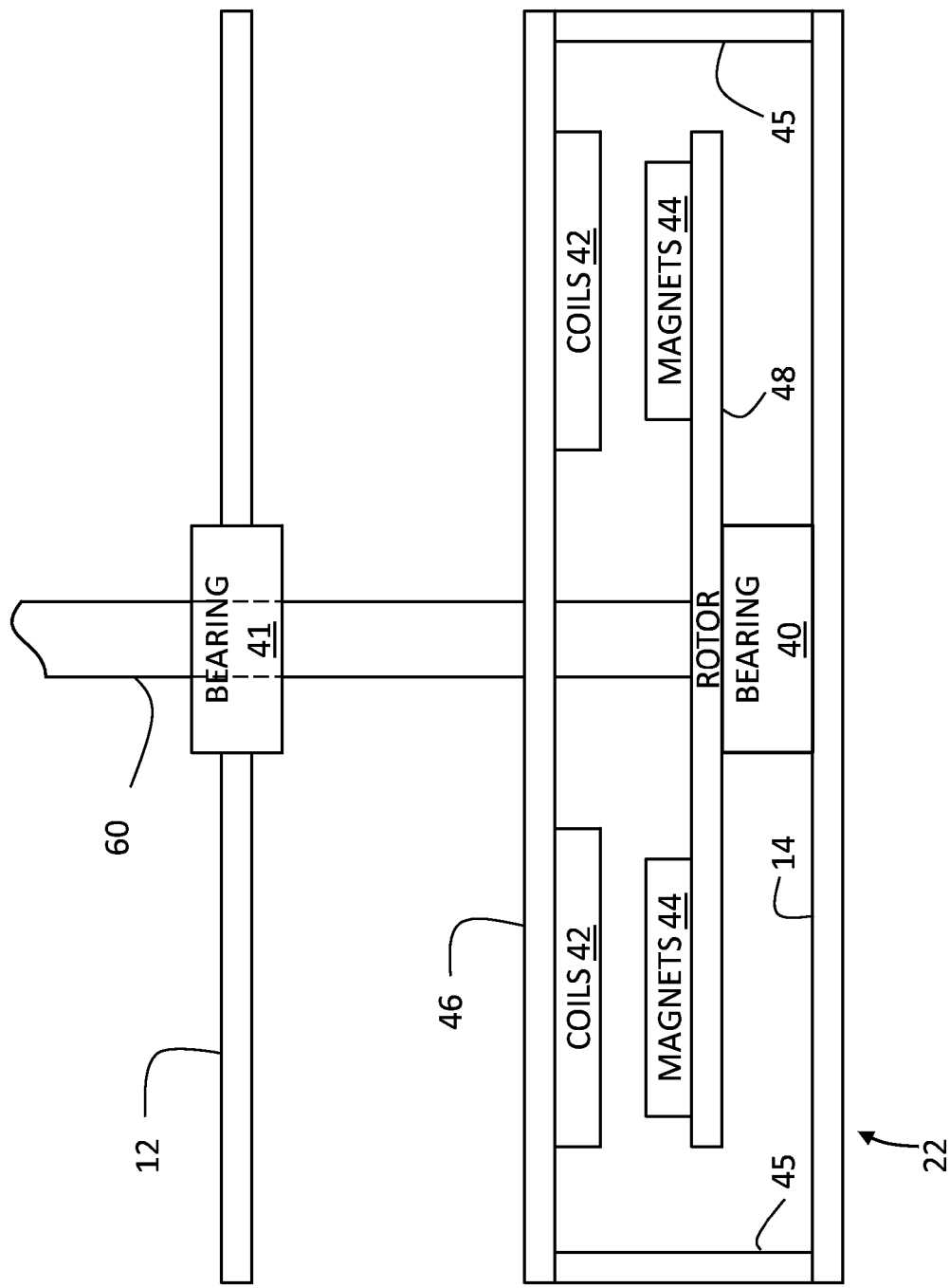
FIG. 4 is a schematic view of a generator of a type for use with energy devices of the invention and connection to a turbine.

In FIG. 4, there is a schematic view of a lower portion of one turbine (e.g., 22 or 22a), including such turbine's shaft 60, which is on the turbine's vertical axis. The shaft has a bearing 41 through which it passes to allow free rotation of the shaft. The bearing is disposed in a portion 12 of a top of housing cover 3a (or 13a). Each generator 22 is part of a generator assembly, which includes a bearing 40 on which a rotor 48 of the generator 22 sits and generator 22 itself. The bearings may be separate from or incorporated into the generator as an assembly.

Each generator is preferably a three phase alternating current axial flux generator. Each generator includes a plurality of coils 42, a plurality of permanent magnets 44, a stator 46, and a rotor 48, which sits on bearing 40, and a plurality of stand offs 45. The bearing 40 is affixed to a bottom portion 14 of housing base 3 (or 13). The shaft 60 attaches not only to bearing 41 but also to bearing 40, as well as the rotor 48, and the turbine itself. The stator 46 is held fixed by the stand offs 45, which are fixed to portion 14 of the base.

The turbine turns when pushed by the kinetic energy in the wind, and transmits such wind power as mechanical power through shaft 60 to the rotor, thereby turning the rotor 48. The spinning rotor 48 and permanent magnets 44 create an alternating current and voltage in the coils 42. The resulting three phase alternating current is then rectified to create DC electrical power output.

Each generator 22 is driven by one of the turbines 20. Alternating current (AC) electrical power is generated and may be rectified to direct current (DC) using rectifier circuit 220. Each generator 22 may be wired in a Star or Wye fashion or in a Delta fashion depending on the required voltage and current needs of the system.

By way of example only, a suitable generator design could have the following parameters:

| Wind Speed (mph) | 4.5 | 6.7 | 8.9 | 11.2 | 13.4 | 15.7 | 17.9 | 20.1 | 22.4 | 24.6 | 26.8 | 29.1 | 31.3 | 33.6 |
|---|---|---|---|---|---|---|---|---|---|---|---|---|---|---|
| Rpm | 58 | 87 | 116 | 145 | 174 | 203 | 231 | 260 | 289 | 318 | 347 | 376 | 405 | 434 |
| Power (W electrical) | 0.4 | 1.5 | 3.5 | 7 | 12 | 19 | 28 | 40 | 56 | 74 | 96 | 123 | 153 | 189 |

One example of a device would have three generators, e.g., each of 50 watts to provide a total of 150 watts of output. However, the devices can be constructed with generator size and number varied as desired, and therefore power output can vary as desired. The 50 watts per generator is based on a one meter by one third meter squared swept area. In a less preferred embodiment, the turbines may be up to 1.5 meter tall, and one half meter diameter for a three quarter meter squared swept area.

Figure 5:
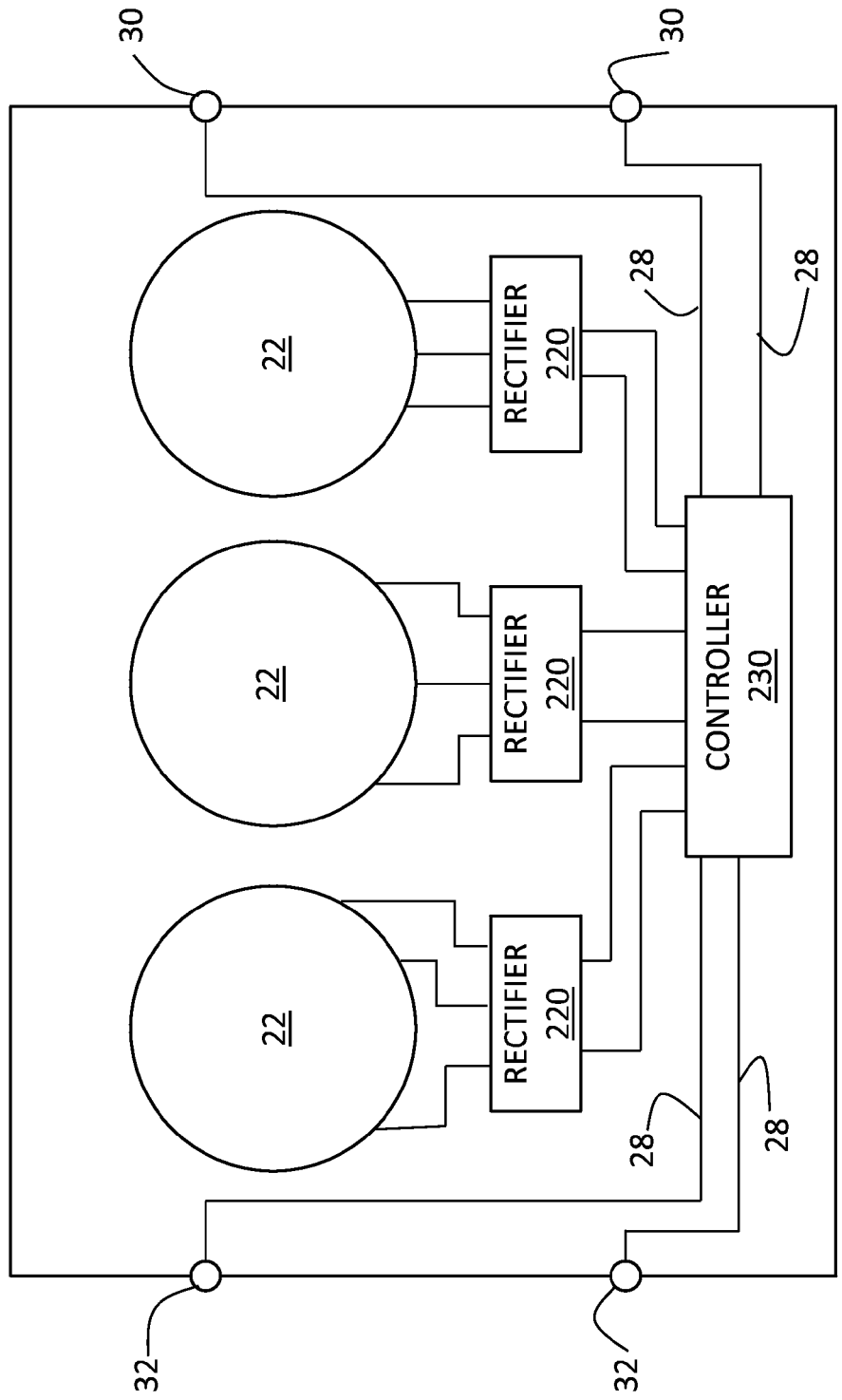
FIG. 5 is a schematic view showing electrical components and wiring of an alternative energy device.

Each unit 1 (or 1a or 1b) (unit 1 with three generators being shown in FIG. 5) includes generators 22, and the printed circuit board having a rectifier circuit 220 for each generator, a controller 230 and connectors 30 at one end (e.g., input end) and connectors 32 at the other end (e.g., output end).

Controller 230 preferably is capable of changing the Star or Delta wiring or each generator's 22 coils in real-time based on the system requirements. Controllers 230 also preferably connect in series or parallel the generator outputs to connectors 30, 32. Controller 230 also preferably can detect whether any external equipment is connected to the device (1 or 1a or 1b) and whether or not the external equipment is an electrical source or sink. If controller 230 detects an external source, such as another device 1, controller 230 will know to receive electrical power from input end connectors 30 and place total output power onto the other set of connectors 32 at the output end.

If controller 230 senses an electrical sink on a pair of connectors, e.g., connectors 32 at the output end (such as an external inverter), controller 230 may be programmed to negotiate with the inverter the voltage requirements to be outputted from the device. If controller 230 senses an electrical sink on a pair of connectors such as a battery, the controller can monitor the charge of any such external battery to avoid over charging it.

Each controller in each device may also be programmed to communicate with all other controllers that are connected via the connectors 30, 32. The controllers can negotiate voltage output levels such that all connected devices 1 (or 1a, etc.) apply the same external voltage to the next connected device. If sufficient devices are connected together, controllers 230 may need to raise the output voltage to reduce the transmitted current. The controllers 230 may also transmit and receive information from an external controller such as a website intended to monitor the system health or weather conditions.

Each controller may also monitor wind speed and either open each generator's electrical circuit or provide power to each generator 22 to make the generator a motor and apply braking to the associated turbines 20 (or 20a, etc.). In either case, the object is to prevent generator 22 from exceeding its rated power (which could damage the generator).

Device Modularity

Figure 6:
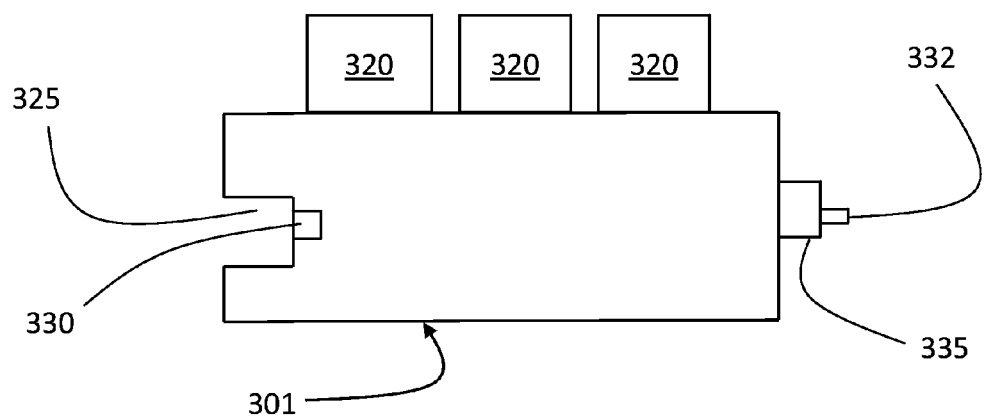
FIGS. 6 and 7 show side and top views, respectively, of how devices can snap fit together.
Figure 7:
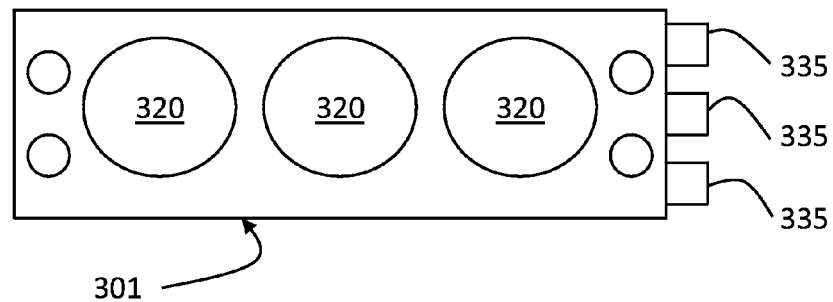

FIGS. 6 and 7 show one way to have structure on the device housing for snap-fitting the devices together. At one end of device 301 there would be two electrical receptors 330, e.g., in a mechanical receptor 325 (a groove or cavity). At the other end would be two electrical plugs 332 or prongs to fit into electrical receptors of an adjacent device, and a mechanical plug 335 sized to friction fit into a mechanical receptor like receptor 325 of an adjacent device. Cords could also be made with electrical plugs and receptors that fit the electrical receptors and plugs of the devices, so that multiple devices can be daisy-chained or snap-fit selectively. Device 301 would otherwise be like device 1 and have turbines 320 like turbines 20, generators, and other structure disclosed herein.

Figure 8:
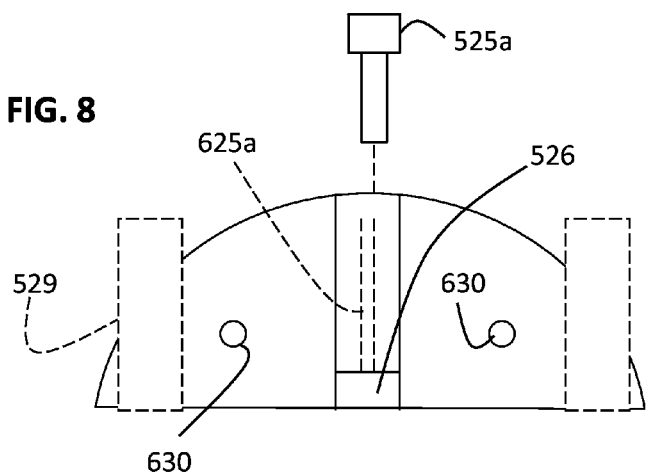
FIGS. 8 and 9 show schematic end and top views of a device with a tongue and groove mechanical connection mechanism, and a spring loaded electrical connection mechanism.
Figure 9:
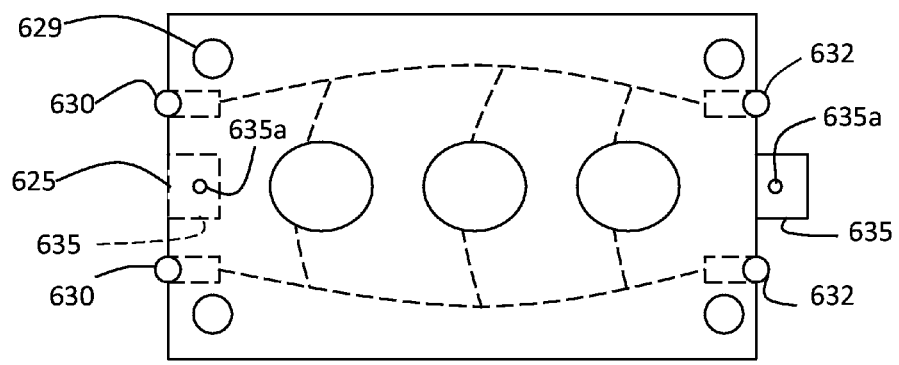

FIGS. 8 and 9 show a schematic view of a device with a tongue and groove mechanical connection mechanism, and a spring loaded electrical connection mechanism. FIG. 8 is an end view of a device and FIG. 9 is a top view of the device. At one end of the device there are electrical contacts 630, and in between those there is a groove 625. A tongue 635 of another device fits into the groove 625 and is held there by a pin 525a which passes through the groove 625 and through a hole 635a in the tongue 1635. A nut 526 may be used to fasten the screw, if a screw is used. Contacts 630 may be formed by spring-loaded disks that mate with contacts 632 of the other device, when the pin or screw 525a is in place. Mounting holes 529 may be used to mount the device by screws, bolts or the like to a surface. FIG. 9 also shows an exemplary layout in dashed lines of the electrical wires (positive and negative) and generators in circular solid lines, for reference.

Turbine and Generator Connection

Figure 10:
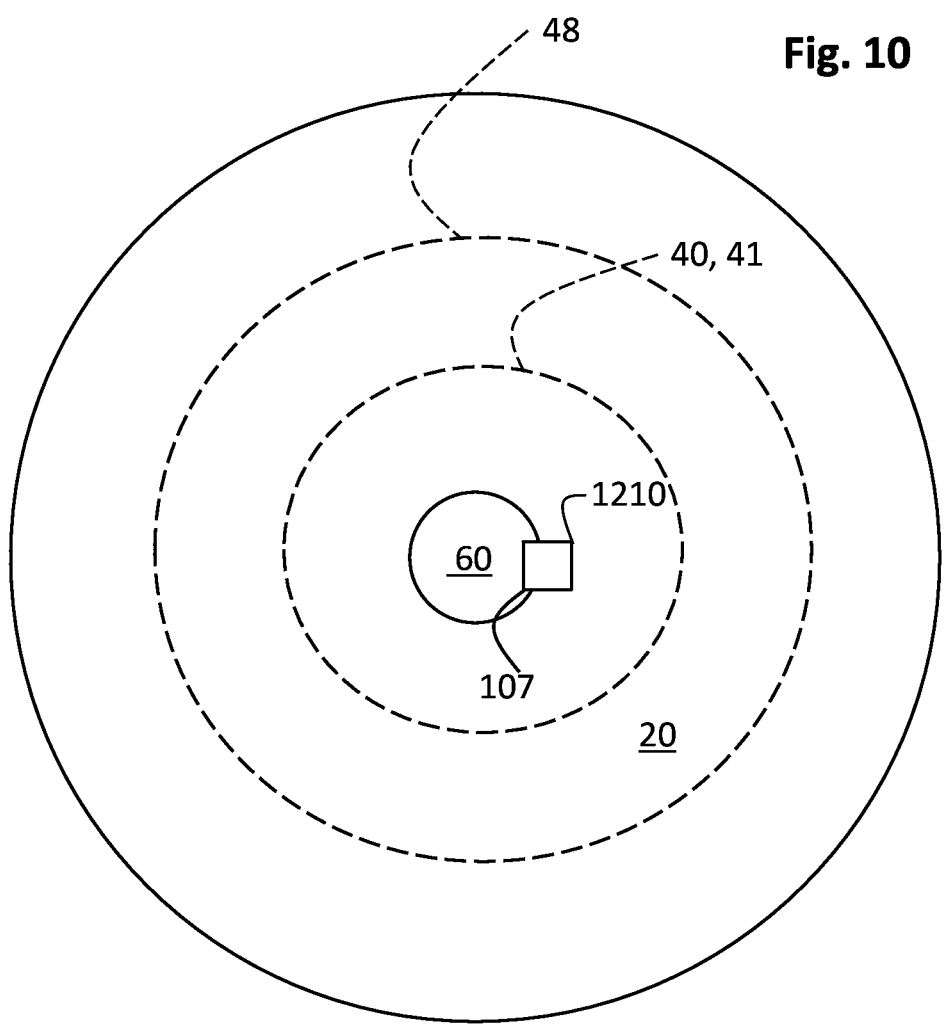
FIG. 10 is a schematic top view of one version of how a turbine fits in a rotor of a generator.

As shown in the top schematic view of FIG. 10, there is a preferred embodiment for fitting the turbines in the generators so that they turn with the rotor, yet can be readily inserted and removable for easy replacement. There is a square "key" 1210 (or other noncircular sectional shape) which preferably extends the length of shaft 60, including the turbine and rotor. The shaft has a female cutout or slot 107 of the key's sectional shape that fits in the shaft. The slot 107 runs the length of the shaft from the top down to the bottom bearing 40 (see FIG. 4) and the key then slides into the slot in the shaft. The turbine 20 has a similar female version of the portion of the key that fits in the turbine. The key also slides into the turbine, just like the rotor. The rotor 48 and bearings 40 and 41 have similar slots to accommodate the key. There may be a nut or other fastener at the top to hold the turbine from coming off vertically. The key is preferably straight, because there is no need for a twist. The shaft 60 and key could also be made as one piece.

Alternative Energy Systems Using the Devices

Figure 11:
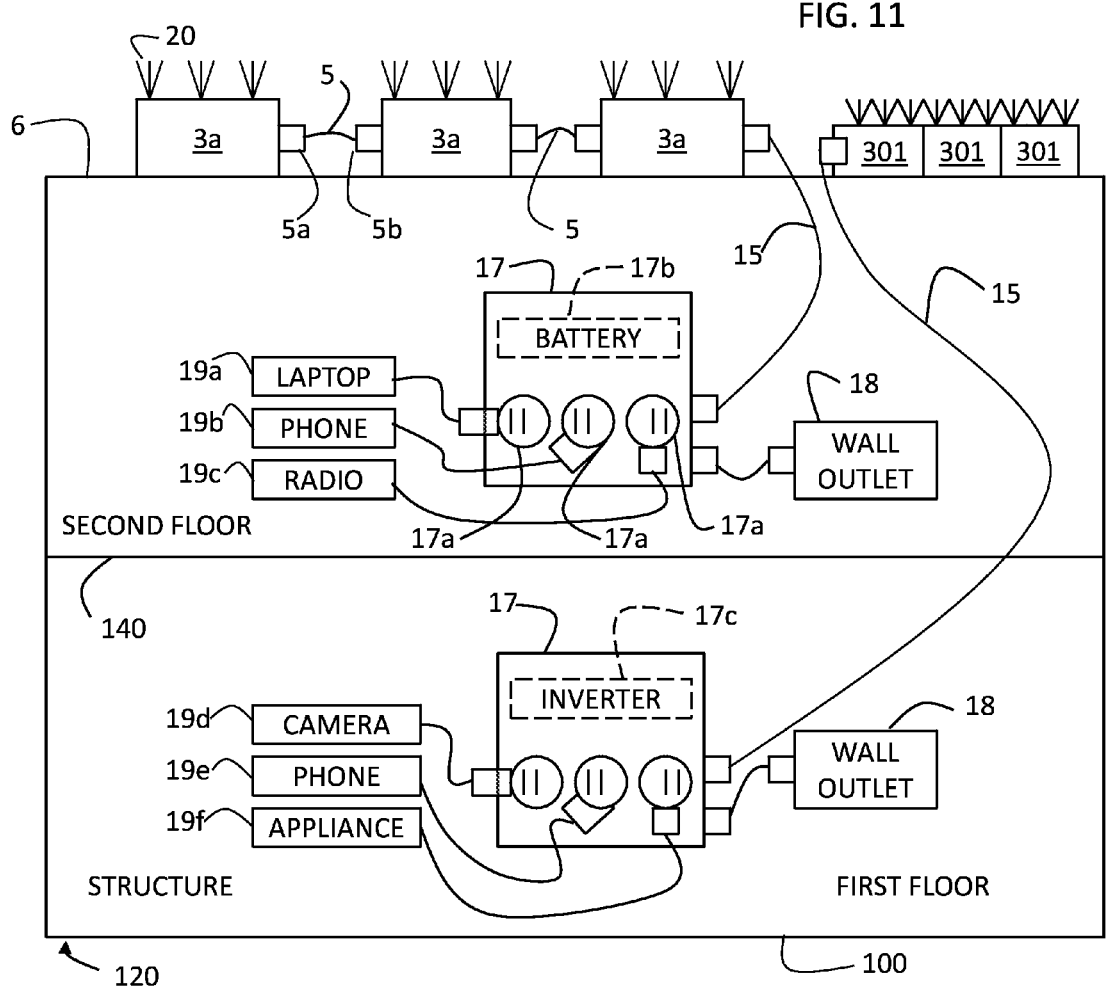
FIG. 11 is a schematic view of an alternative energy system in accordance with a first system embodiment of the invention, incorporating various alternative energy devices having three turbines in accordance with FIG. 1.

As shown in FIG. 11, each device is preferably modular and may be connected by a cord 5 containing electrical wires, or by directly connecting such as with plugs. The devices connected by cords 5 are shown with covers 3a schematically and the devices 1301 connected by direct connection are shown schematically.

On the left side of a structure's roof 6, there are three devices connected by cords 5, and on the right side are three devices that are directly connected. Depending upon the use, one or the other may be preferred. For example, where the devices are aligned on a straight path, direct connection may be preferred. Where the devices must be connected at angles to each other, daisy-chaining using cords 5 is preferred.

For the daisy-chain type device, there may be an outlet-style connector or other female connector at one end of the device, and a plug or male type connector at the other end. Each cord 5 would have a male connector 5a at one end and a female connector 5b at the other, like an extension cord. The length of the cord would vary as desired or needed for the application.

While the cords used preferably have plug in connectors, such as male connectors at one end and female connectors at the other, the power unit and/or the devices could be made with integral cords.

It is also most preferred that the alternative energy devices each be constructed identically or at least identically at the ends. Therefore, even within one chain of devices, some can be daisy-chained and others can be snapped or friction fit together.

FIG. 11 shows an alternative energy system. The devices are constructed so as to be modular, and thereby allow addition of the small amounts of energy generated by each device, even though relatively small rotors (generators) are used. For example, each generator and turbine may be sized and paired so as to produce fewer than 100 watts per generator, and so as to have their rotor's spin under 1000 RPMs.

FIG. 11 shows two sets of three devices. Each set is connected by a long cord 15 (or wire) to a power unit 17. The power unit 17 is generally shaped like a standard power strip, but thicker, having multiple outlets 17a and may plug into a wall outlet 18. It also has a place to plug the long cord 15 that at the other end is plugged into the alternative energy device(s), so that the power unit receives the electrical output from them. The unit may contain a battery 17b or batteries, charged by the alternative energy devices, or there may be an inverter 17c.

The power unit 17 has multiple outlets 17a for electronic devices, such as a cell phone charger, an iPod®, a laptop computer, to be plugged into for power.

In FIG. 11, small devices such as laptop 19a, a cell phone 19b, a radio 19c, a camera 19d, another cell phone 19e and an appliance (i.e., representing any small device, meaning a device or appliance taking a relatively small amount of energy to run, on the order of a camera, cell phone, laptop, clock radio, or the like) are shown for illustrative purposes.

The power unit may also optionally have a plug for a regular electrical outlet in the event of shortfall by the alternative energy devices in the system. The power unit would also optionally and preferably have a battery, e.g., a lithium battery or batteries, to store excess electrical energy received from the wind energy devices.

In FIG. 11 there is an alternative energy system for first floor 100 of a structure 120 and one for second floor 140. Additional alternative energy systems could be added. Further devices can be plugged into the three devices (e.g., devices 1301) or daisy chained to the other three devices (having cover 3a).

As noted above, each device captures very low wind energies, i.e., a light breeze, because it has multiple turbines and multiple generators in a unit, and is further assisted by the very lightweight of the turbine set especially where made of plastic. Use of a smaller generator and smaller turbines lowers the energy needed to turn the turbines and overcome the inertia of the generator (windings). The devices may operate omni-directionally, i.e., with low wind coming in virtually any direction.

The devices and system is preferably self-starting, i.e., starting with low power winds. A helical blade arrangement is one way to facilitate self-starting, and other ways may be used. One could also provide a wind sensor and a battery in each device, which battery starts the generators turning when wind speed reaches a sufficient amount to overcome the dynamic moment of inertia, even though insufficient to overcome the static moment of inertia. Further, e.g., in the embodiment of FIG. 12, a hybrid device having a solar panel could have a battery on board and use the solar power to start the turbines when the wind speed reaches or exceeds the dynamic moment of inertia.

Figure 12:
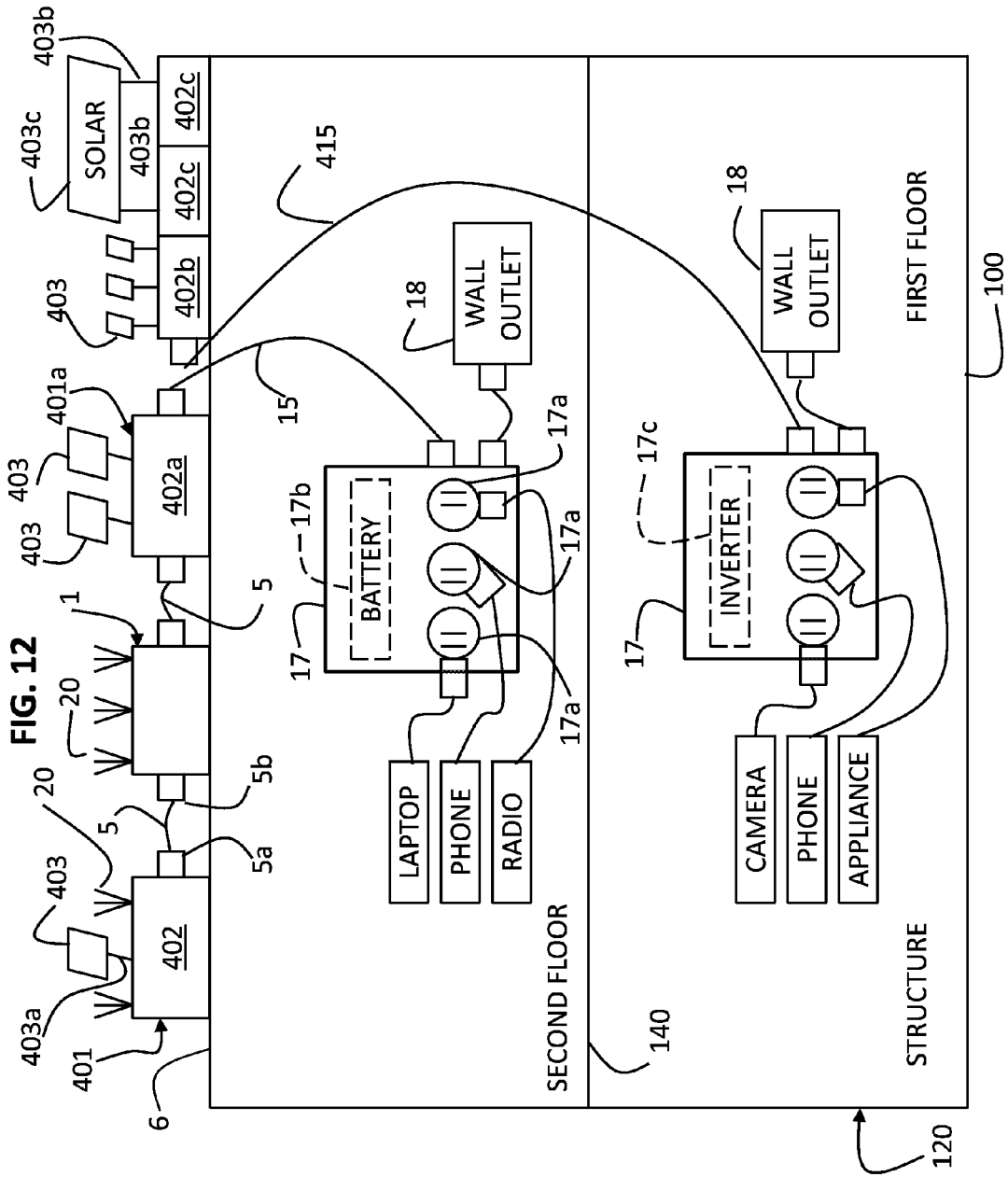
FIG. 12 is a schematic view of an alternative energy system in accordance with a second system embodiment of the invention, incorporating various alternative energy devices.

FIG. 12 shows another embodiment, like the system of FIG. 11, but where at least some of the alternative energy devices are hybrid and/or the system contains a mixture of devices. Specifically, in the daisy-chain of three devices (left side) there is one hybrid device 401 having a small solar panel 403 (on a post 403s) and two wind turbines 20 for one housing 402. Therefore the device can generate at least some energy under no wind conditions, as long as there is sufficient sun. In fact, that energy could be used to help start the turbines in low wind conditions sufficient for keeping the moving turbine turning but not sufficient to overcome the movement of inertia of the generators associated with the turbines. Another device is shown in the daisy-chain with multiple solar panels 403 and having a housing 402a. The solar panels produce electrical energy, and so there is no need for a generator in the base that would be associated with the solar panel. Rather, there would just be positive and negative terminals to which to connect the positive and negative wires of the generators (that are associated with the turbines) in series.

Also shown (right side on the roof of the structure) is a device having a housing 402b with three solar panels 403 on it, and two devices having housings 402c that support a larger solar panel 403c on two posts 403b. Those devices could also have turbines thereon, and be of an arrangement such as shown in FIG. 14, where there is a mounting bracket that can be attached to the bases of turbines, to support a solar panel.

Figure 13:
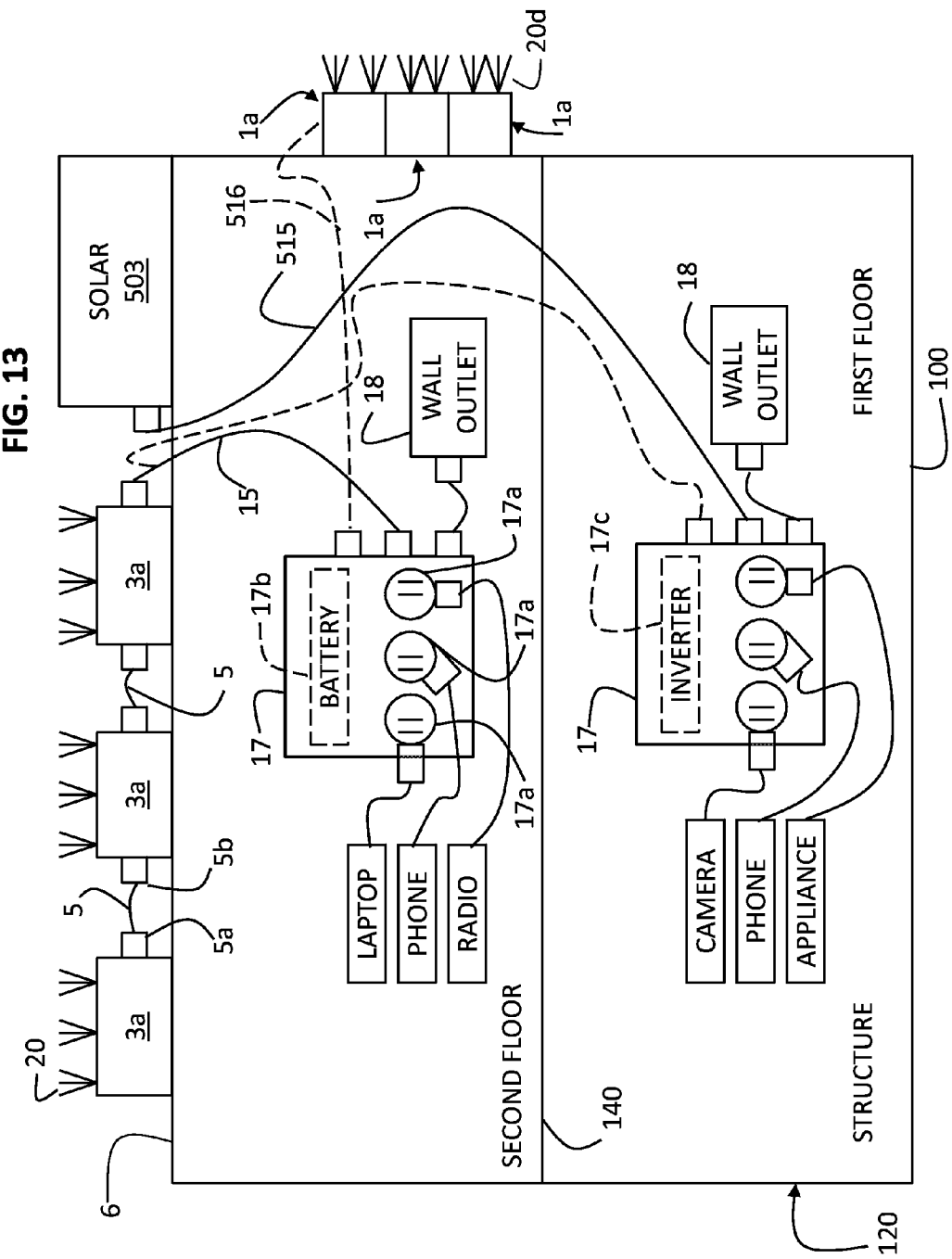
FIG. 13 is a schematic view of another type of alternative energy system in accordance with a third system embodiment.

FIG. 13 shows an arrangement where a solar power cell is used, which may optionally plug into a power unit that also receives power from a group of the turbine alternative energy devices. Accordingly, each power unit may have multiple inlets for a turbine set or sets and/or a solar set or sets. FIG. 14 also shows a sideways mounting of the devices 1a (which could be devices 1 or other devices in accordance with the invention).

Figure 14:
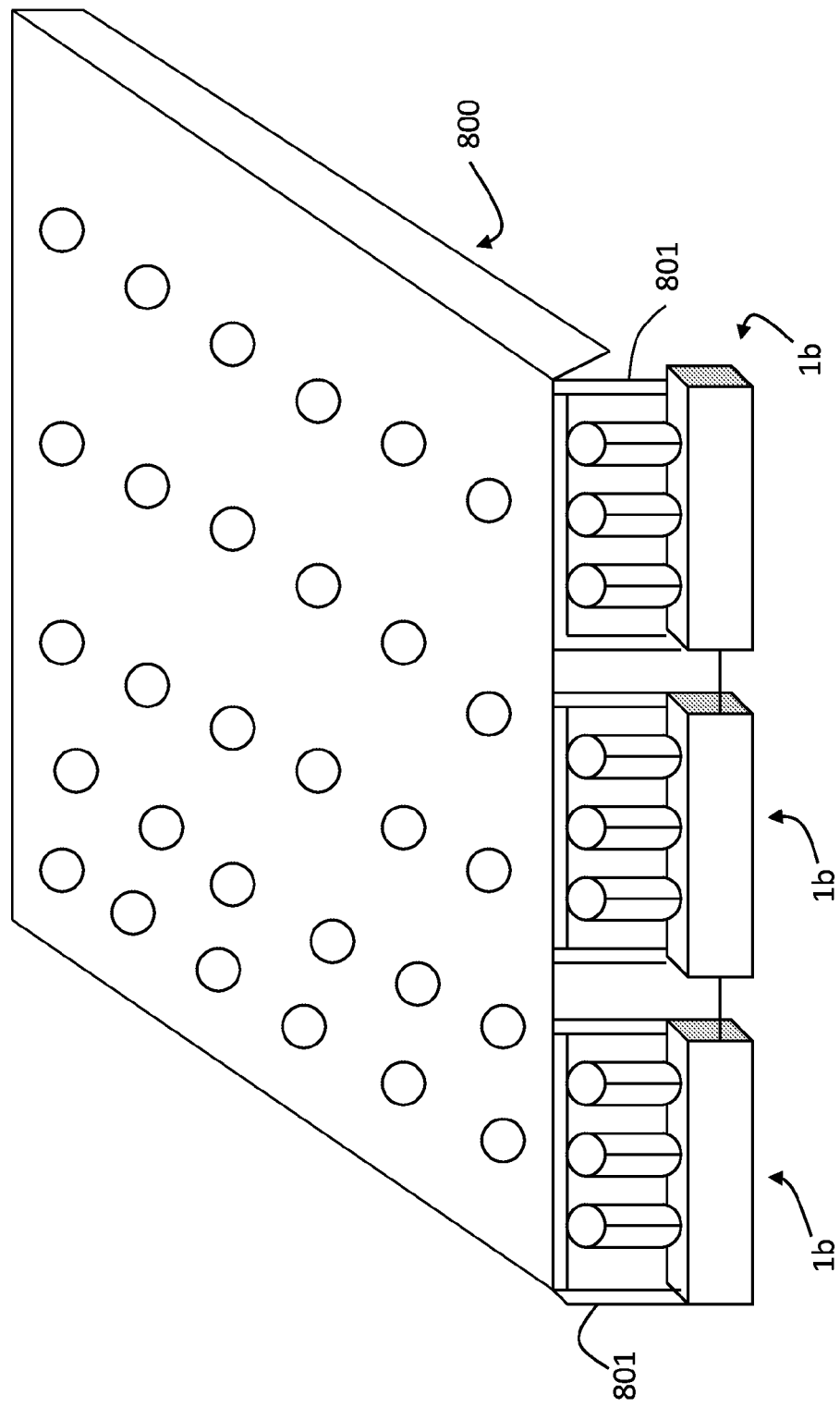
FIG. 14 is a schematic exploded view of alternative energy devices showing a grouping of such devices with a solar panel added thereto in accordance with a fourth system embodiment.

With reference to FIG. 14, a solar panel 800 is mounted on brackets 801 that are supported by three alternative energy devices or units 1b, which units may be the same or substantially the same as the units 1 or 1a, along with structure to support brackets 801, which structure for support would be evident to one of ordinary skill in the art.

Versatility and Stand-Alone Uses

Figure 15:
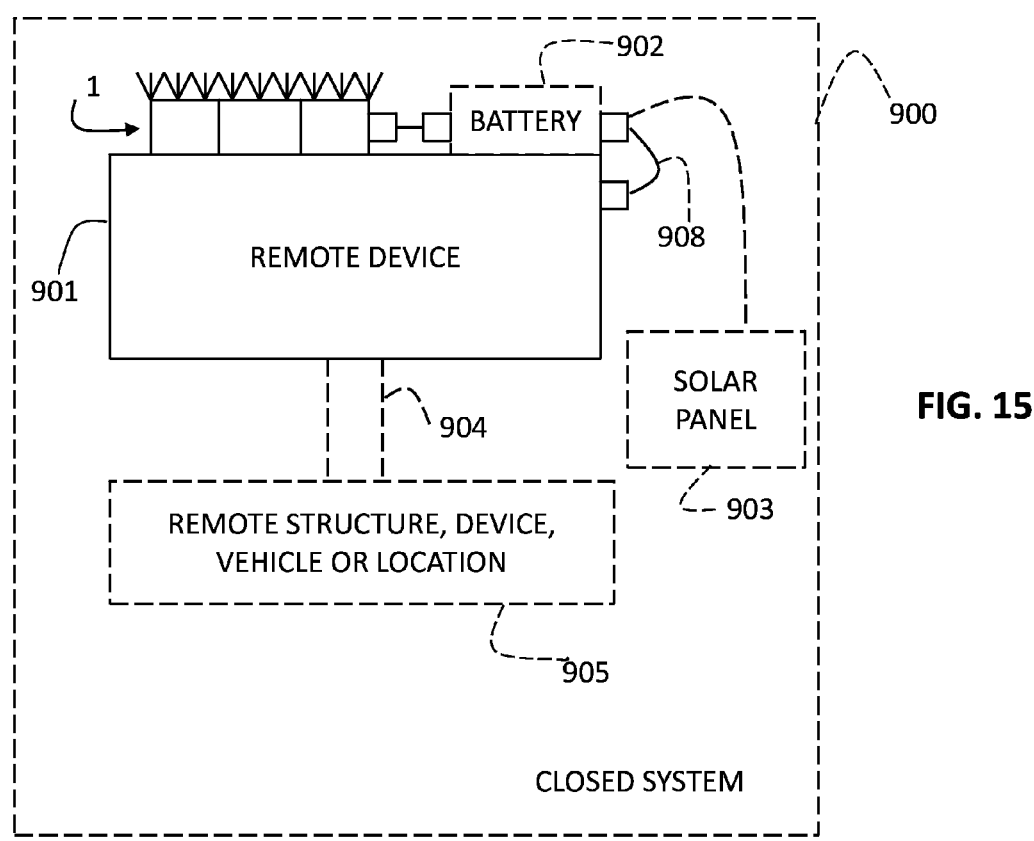
FIG. 15 is a schematic view of another type of alternative energy device system in accordance with a fifth system embodiment.

As shown in FIG. 15, there are many stand-alone uses of the device and system. For example, uses include traffic speed displays, call boxes, security devices and lighting anywhere in a "closed system." There are a myriad of other stand-alone uses, such as for powering Christmas lights, or an electronic billboard, portable power (for camping), on a buoy to power a light thereon. In such uses, as with the above embodiments, the device/system may be combined with solar energy for a hybrid system to provide power under a greater variety of conditions.

For example, FIG. 15 shows a closed system 900 which may have alternative energy devices 1 mounted on a remote device 901, such as a freeway sign, billboard, street light, speed meter or video camera. There may be a battery 902 also mounted on remote device 901. There may also be supplemental solar power using a solar panel 903 connected to battery 902. Battery 902 would then have a cable or wire 908 to plug into the remote device. Remote device 901 may be mounted directly on the ground, or by support 904 on a remote structure, device, vehicle or location 905, e.g., a highway, freeway median, pier, dock, farm, beach, boat, car, truck, lighthouse, buoy, building, tower, water tower, fence, high rise, camp site, tent, RV, tool shed, or other remote structure, device, vehicle or location.

Although the invention has been described using specific terms, devices, and/or methods, such description is for illustrative purposes of the preferred embodiment(s) only. Changes may be made to the preferred embodiment(s) by those of ordinary skill in the art without departing from the scope of the present invention, which is set forth in the following claims. In addition, it should be understood that aspects of the preferred embodiment(s) generally may be interchanged in whole or in part.

What is claimed is:

1. A wind energy unit comprising:
   a. a housing;
   b. at least two turbines mounted on the housing, each of the turbines having a blade set having a vertical axis orientation for rotation in the same rotational direction and extending upward in relation to the housing;
   c. each of the turbines having a generator connected thereto for generating electrical current in response to wind energy turning the turbines, each of the generators is disposed in the housing; and
   d. wherein a first end of the housing has a positive contact and a negative contact, and a second end of the housing remote from the first end has a positive contact and a negative contact, for electrical connection to the electrical current from the generator.

2. The wind energy unit of claim 1, wherein each of the turbines is directly connected to the rotor in a one to one rotational relationship.

3. The wind energy unit of claim 1, wherein the housing has three turbines disposed along a line.

4. The wind energy unit of claim 1, further comprising a solar panel.

5. The wind energy unit of claim 1, further comprising a solar panel for producing energy for use for starting the turbines when wind conditions are insufficient for overcoming the moment of inertia of the generators associated with the turbines.

6. The wind energy unit of claim 1, wherein the housing and the turbines are of plastic and at least one of injection molded or blow molded.

7. The wind energy unit of claim 1, wherein each of the turbines is about one meter tall and about one third of a meter in diameter and each of the turbines has a swept area of about one third of a square meter.

8. The wind energy unit of claim 1, wherein each of the turbines is less than one and a half meters tall and less than one half meter in diameter.

9. The wind energy unit of claim 1, wherein the positive and the negative contacts of the first end of the unit is adapted for being electrically connected to the positive and the negative contacts, respectively, of the second end of another energy unit.

10. The wind energy unit of claim 1, wherein each of the turbines and each of the rotors is designed to turn at no more than about 1000 RPMs, and each of the generators is designed to produce no more than about 150 watts.

11. A wind energy unit comprising:
   a. a housing;
   b. at least two turbines mounted on the housing, each of the turbines having a blade set having a vertical axis orientation for rotation in the same rotational direction and extending upward in relation to the housing;
   c. each of the turbines having a generator connected thereto and being directly connected to a rotor in a one to one rotational relationship of the generator for generating electrical current in response to wind energy turning the turbines, each of the generators is disposed in the housing;
   d. wherein a first end of the housing has a positive contact and a negative contact, and a second end of the housing remote from the first end has a positive contact and a negative contact, for electrical connection to the electrical current from the generators in the housing; and
   e. wherein the positive contact and negative contact at the first end and at the second end each have means associated therewith for electrical connection to positive and negative contacts of additional wind energy units.

12. The wind energy unit of claim 11, wherein the housing has three turbines disposed along a line.

13. The wind energy unit of claim 11, further comprising a solar panel.

14. The wind energy unit of claim 11, further comprising a solar panel for producing energy for use for starting the turbines when wind conditions are insufficient for overcoming the moment of inertia of the generators associated with the turbines.

15. The wind energy unit of claim 11, wherein the housing and the turbines are of plastic and at least one of injection molded or blow molded.

16. The wind energy unit of claim 11, wherein each of the turbines is about one meter tall and about one third of a meter in diameter and each of the turbines has a swept area of about one third of a square meter.

17. The wind energy unit of claim 11, wherein each of the turbines is less than one and a half meters tall and less than one half meter in diameter.

18. The wind energy unit of claim 11, wherein each of the turbines and each of the rotors is designed to turn at no more than about 1000 RPMs, and each of the generators is designed to produce no more than about 150 watts.

19. A lightweight portable modular wind energy unit comprising:
   a. a housing;
   b. at least two turbines mounted on the housing, each of the turbines having a blade set having a vertical axis orientation for rotation in the same rotational direction and extending upward in relation to the housing, each of the housing and the two turbines being at least one of injection molded and blow-molded, and each said blade set being unitary with an axis of each said turbine;
   c. each of the turbines having a generator connected thereto and being directly connected to a rotor in a one to one rotational relationship of the generator for generating electrical current in response to wind energy turning the turbines, each of the generators is disposed in the housing;
   d. wherein a first end of the housing has a positive contact and a negative contact, and a second end of the housing remote from the first end has a positive contact and a negative contact, for electrical connection to the electrical current from the generators in the housing;
   e. wherein the positive contact and negative contact at the first end and at the second end each have means associated therewith for electrical connection to positive and negative contacts of additional wind energy units;

f. wherein each of the turbines is less than one and a half meters tall and less than one half meter in diameter; and g. a printed circuit board disposed in the housing and electrically connected to each generator.

20. The wind energy unit of claim 19, further comprising a solar panel.

\* \* \* \* \*